United States Patent
Jung

(10) Patent No.: US 12,037,054 B2
(45) Date of Patent: Jul. 16, 2024

(54) STEER-BY-WIRE STEERING APPARATUS

(71) Applicant: HL MANDO CORPORATION, Gyeonggi-do (KR)

(72) Inventor: Dae Hee Jung, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 212 days.

(21) Appl. No.: 17/796,673

(22) PCT Filed: Feb. 10, 2021

(86) PCT No.: PCT/KR2021/001772
§ 371 (c)(1),
(2) Date: Jul. 31, 2022

(87) PCT Pub. No.: WO2021/162441
PCT Pub. Date: Aug. 19, 2021

(65) Prior Publication Data
US 2023/0053581 A1 Feb. 23, 2023

(30) Foreign Application Priority Data

Feb. 12, 2020 (KR) .......... 10-2020-0017251

(51) Int. Cl.
*B62D 5/00* (2006.01)
*B62D 5/04* (2006.01)
*B62D 15/02* (2006.01)

(52) U.S. Cl.
CPC .......... *B62D 5/001* (2013.01); *B62D 5/0445* (2013.01); *B62D 15/0225* (2013.01)

(58) Field of Classification Search
CPC .......... B62D 5/004; B62D 5/0445; B62D 3/02
See application file for complete search history.

(56) References Cited

U.S. PATENT DOCUMENTS

2006/0170415 A1* 8/2006 Budaker ................ B62D 15/02
324/207.13
2012/0097473 A1* 4/2012 Tashiro ................ B62D 5/0448
180/444

(Continued)

FOREIGN PATENT DOCUMENTS

CN 1445126 10/2003
CN 1869478 11/2006

(Continued)

OTHER PUBLICATIONS

International Search Report for PCT/KR2021/001772 mailed on May 21, 2021 and its translation provided by WIPO (now published as WO 2021/162441).

(Continued)

*Primary Examiner* — Long T Tran
(74) *Attorney, Agent, or Firm* — Womble Bond Dickinson (US) LLP

(57) ABSTRACT

According to the embodiments of the present invention, the overall size reduction allows installation space to be advantageously secured, reduction in noise generated during operation improves the comfort of the driver, and the strength and stability of the connective structure between parts can be increased and power transmission can be more effective.

15 Claims, 8 Drawing Sheets

(56) References Cited

U.S. PATENT DOCUMENTS

| | | | | |
|---|---|---|---|---|
| 2013/0161117 A1* | 6/2013 | Higashi | ............... | B62D 5/001 180/446 |
| 2018/0251150 A1 | 9/2018 | Ognibene | | |
| 2018/0297628 A1* | 10/2018 | Bando | ............... | B62D 3/12 |
| 2019/0329816 A1* | 10/2019 | Ko | ............... | B62D 5/0424 |
| 2020/0262470 A1* | 8/2020 | Kondo | ............... | B62D 3/12 |

FOREIGN PATENT DOCUMENTS

| | | |
|---|---|---|
| CN | 105197099 A | 12/2015 |
| CN | 108367771 A | 8/2018 |
| CN | 108372880 A | 8/2018 |
| CN | 208868130 | 5/2019 |
| EP | 3 348 865 | 7/2018 |
| JP | 2006-329259 | 12/2006 |
| JP | 2012-066788 | 4/2012 |
| JP | 2012-162239 | 8/2012 |
| KR | 10-2016-0050133 | 5/2016 |
| WO | 82-03435 | 10/1982 |

OTHER PUBLICATIONS

Written Opinion of the International Searching Authority for PCT/KR2021/001772 mailed on May 21, 2021 and its English Machine Translation by Google Translate (now published as WO 2021/162441).

Office Action dated Dec. 14, 2023 for Chinese Patent Application No. 202180014020.2 and its English machine translation by Google Translate.

Jingbo Hu et al., "Reliability Design of Steer-by-Wire Steering System for Articulated Loaders", Construction Machinery and Equipment, vol. 38, No. 5, May 2007, 5 pp total (English Abstract Provided).

Notice of Allowance dated May 11, 2024 for Chinese Patent Application No. 202180014020.2 and its English machine translation provided by Global Dossier.

* cited by examiner

STEER-BY-WIRE STEERING APPARATUS

TECHNICAL FIELD

The present embodiments relate to a steer-by-wire steering device and, more specifically, to a steer-by-wire steering device that has an advantage in securing an installation space due to a reduction in the overall size, has reduced noise generation during driving to increase the driver's convenience, and has increased power transfer efficiency and stability and rigidity in the inter-component coupled structure.

BACKGROUND ART

A steer-by-wire steering device is a kind of electromotive steering device that steers the vehicle using electric power without any mechanical connection, such as a steering column or universal joint, between the steering wheel and the front wheel steering device.

In other words, the driver's manipulation of the steering wheel is converted into an electric signal, and the electronic control device receives the electric signal and accordingly determines the output of the motor. Due to a lack of mechanical connection, the steer-by-wire system reduces injury to the driver by a mechanical part when a car crash occurs. Further, by saving parts, e.g., hydraulic parts and mechanical connections, the steer-by-wire system may lead to lightweight vehicles and a significant reduction in assembly line man-hour, thereby saving unnecessary energy consumption during steering and hence enhancing fuel efficiency. Further, it is possible to achieve ideal steering performance by ECU programming.

The conventional steer-by-wire steering device has a worm-worm wheel reducer or a ball nut reducer to reduce the torque of the motor. However, the worm-worm wheel reducer has weak durability and is unable to provide high power, and the ball nut reducer inevitably has a large lead for the rack bar and ball nut screw due to insertion of balls and thus has a small reduction ratio, requiring that a pulley-belt reduction structure be added to secondarily reduce the torque.

Further, the conventional ball nut reducer inevitably generates knocking sounds while the balls circulate, deteriorating the driver's steering feel. In particular, autonomous driving requires minimized noise, and the motor is spaced apart from the rack bar, so that the steering device becomes bulky and, given the rigidity of the belt, the motor has difficulty in outputting high torque.

DETAILED DESCRIPTION OF THE INVENTION

Technical Problem

The present embodiments have been conceived in the foregoing background and relate to a steer-by-wire steering device that has an advantage in securing an installation space due to a reduction in the overall size, has reduced noise generation during driving to increase the driver's convenience, and has increased power transfer efficiency and stability and rigidity in the inter-component coupled structure.

Technical Solution

According to the present embodiments, there may be provided a steer-by-wire steering device, comprising a sliding bar provided to be axially slidable in a housing and having a screw formed on an outer circumferential surface thereof, a first shaft hollow to allow the sliding bar to be inserted thereto and rotated by an actuator, a plurality of second shafts circumferentially provided between the sliding bar and the first shaft and including a screw shaft portion having a screw formed on an outer circumferential surface thereof to be engaged with the sliding bar, and a supporting member formed in an annular shape to be coupled to an inner circumferential surface of the first shaft and having a coupling hole through which an end of the second shaft is inserted and coupled.

Advantageous Effects

According to the present embodiments, it is possible to provide an advantage in securing an installation space due to a reduction in the overall size, reduce noise generation during driving to increase the driver's convenience, and increase power transfer efficiency and stability and rigidity in the inter-component coupled structure.

MODE FOR CARRYING OUT THE INVENTION

Figure 1:
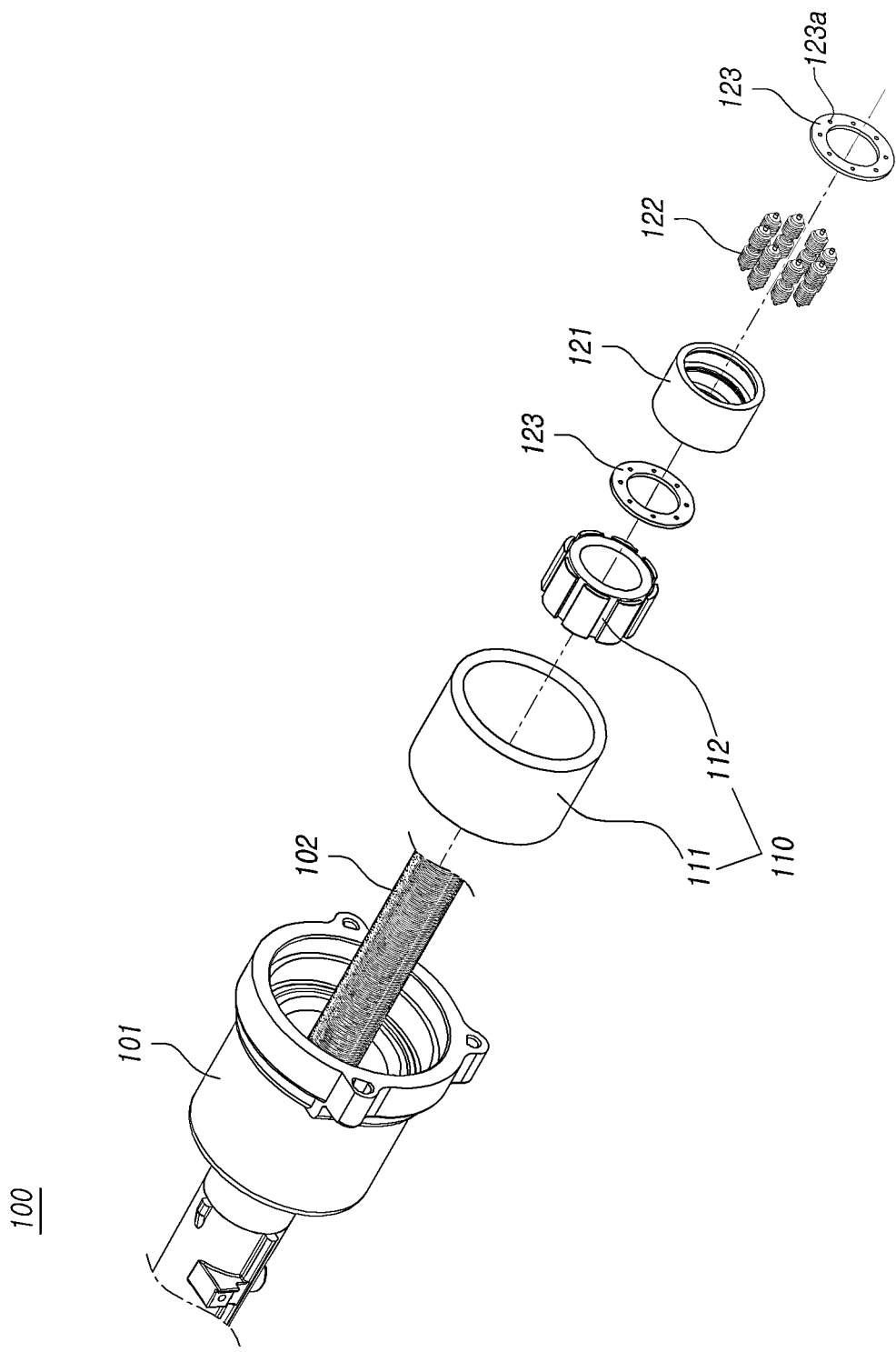
FIG. 1 is an exploded perspective view illustrating a portion of a steer-by-wire steering device according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
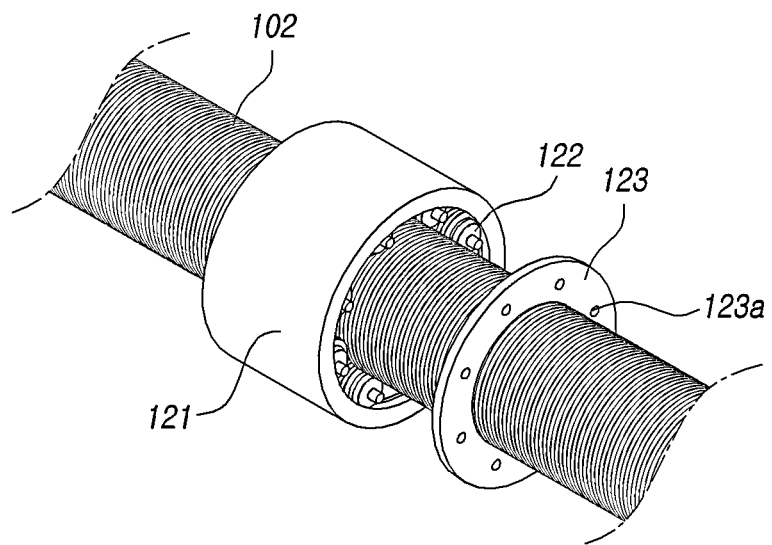
FIG. 2 is a perspective view illustrating a portion of FIG. 1.
Figure 3:
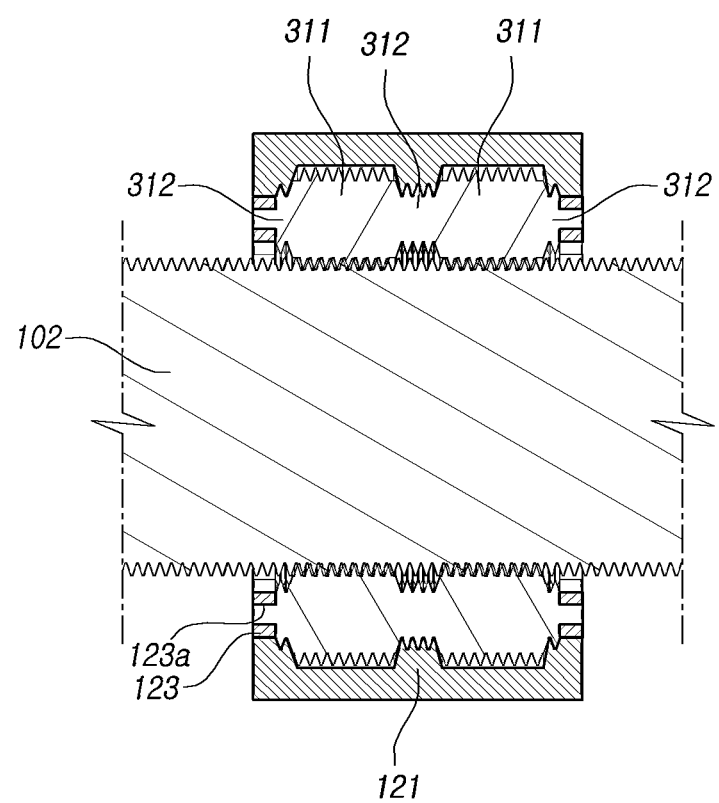
FIG. 3 is a cross-sectional view illustrating an assembled state of FIG. 2.
Figure 4:
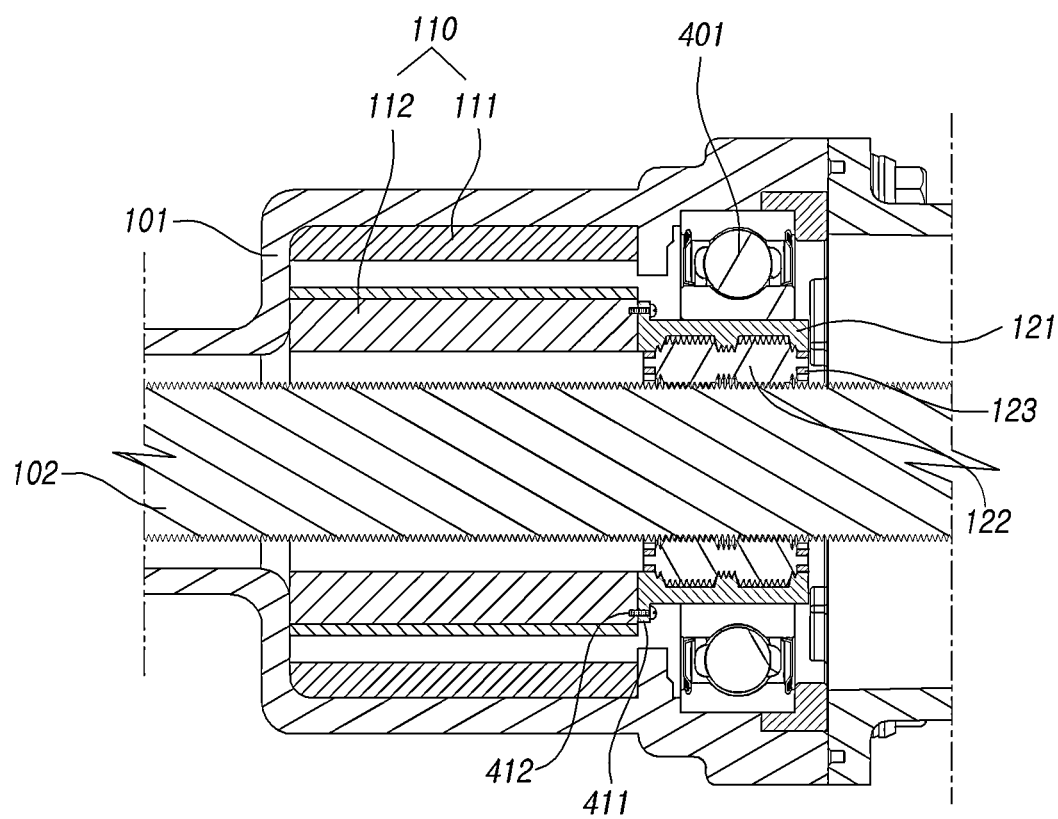
FIGS. 4 and 5 are cross-sectional views illustrating a steer-by-wire steering device according to the present embodiments.
Figure 5:
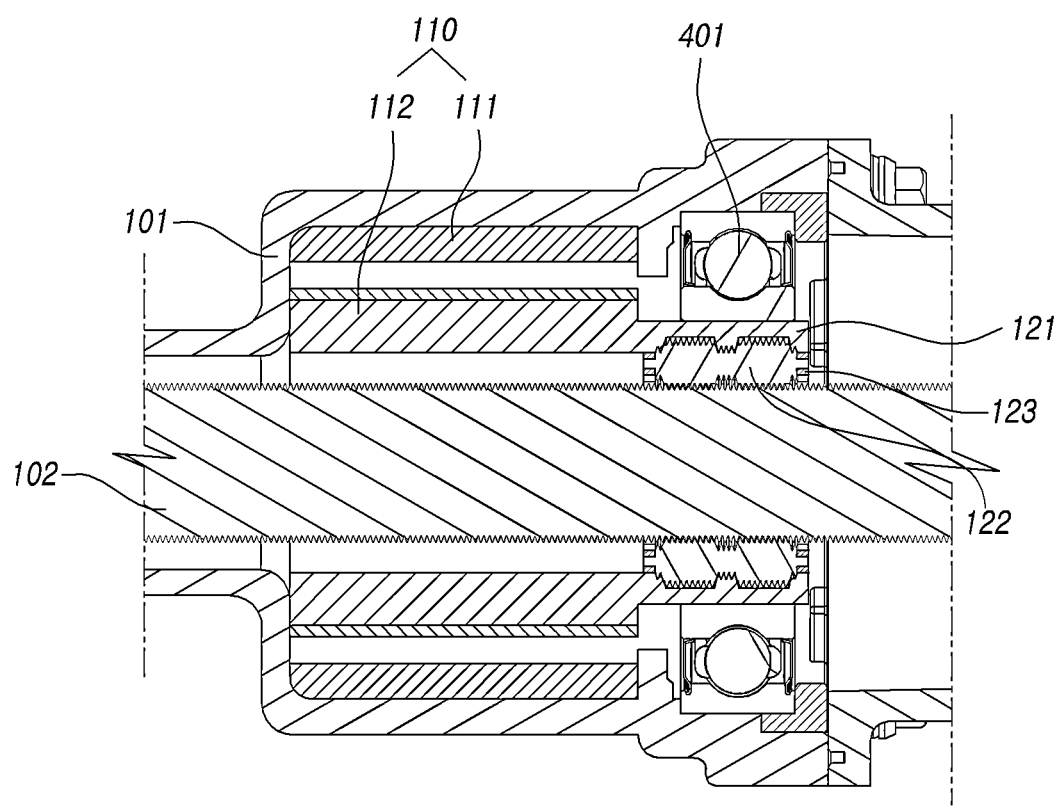
Figure 6:
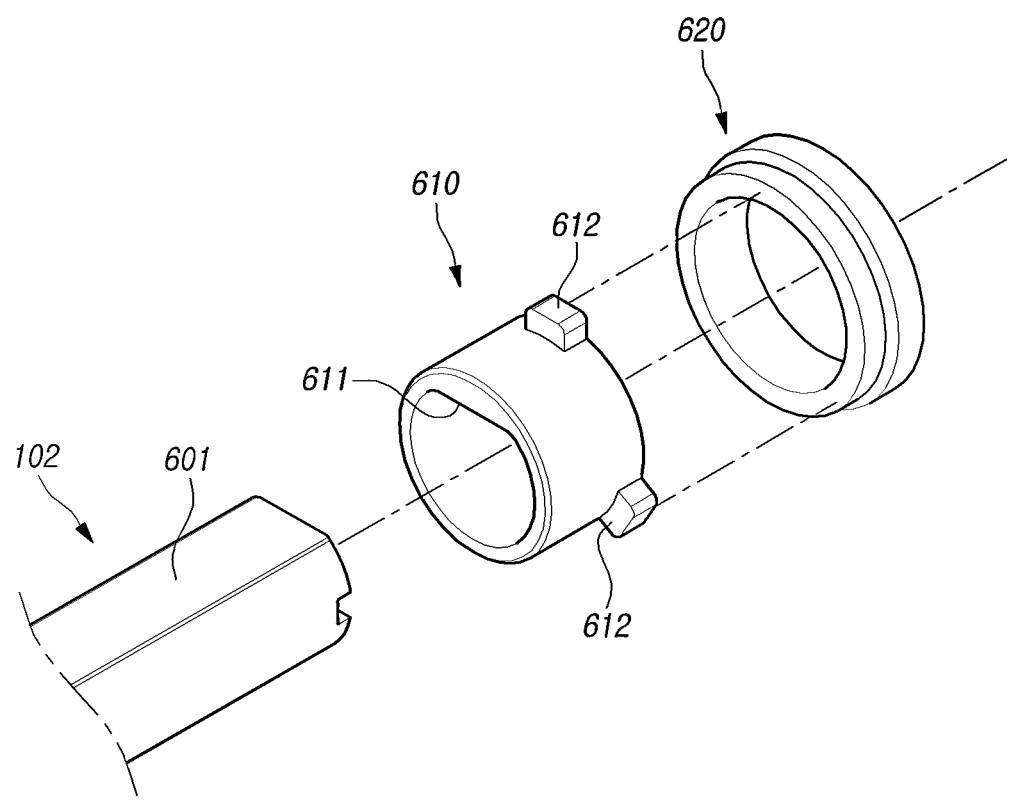
FIG. 6 is an exploded perspective view illustrating a portion of a steer-by-wire steering device according to the present embodiments.
Figure 7:
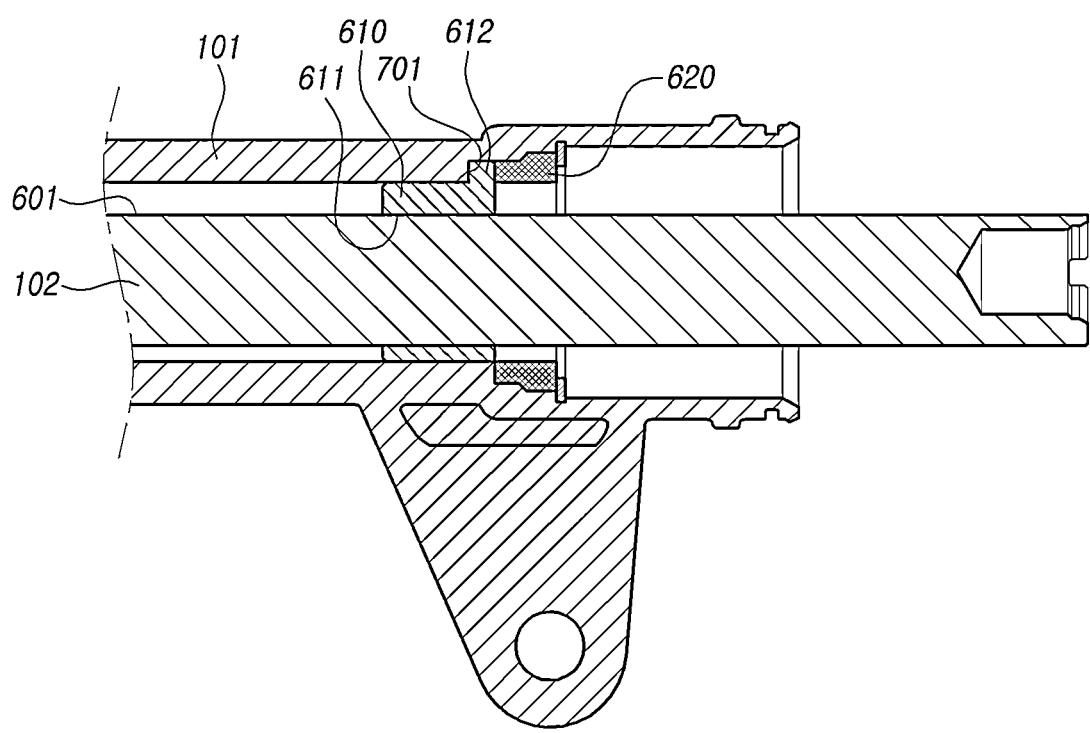
FIG. 7 is a cross-sectional view illustrating an assembled state of FIG. 6.
Figure 8:
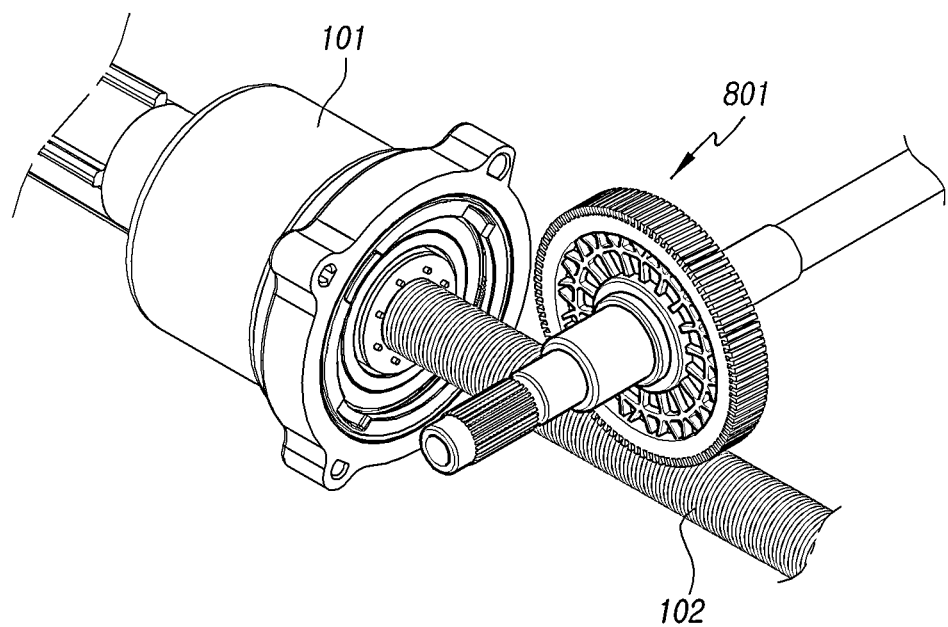
FIG. 8 is an exploded perspective view illustrating a portion of a steer-by-wire steering device according to the present embodiments.

FIG. 1 is an exploded perspective view illustrating a portion of a steer-by-wire steering device according to the present embodiments. FIG. 2 is a perspective view illustrating a portion of FIG. 1. FIG. 3 is a cross-sectional view illustrating an assembled state of FIG. 2. FIGS. 4 and 5 are cross-sectional views illustrating a steer-by-wire steering device according to the present embodiments. FIG. 6 is an exploded perspective view illustrating a portion of a steer-by-wire steering device according to the present embodiments. FIG. 7 is a cross-sectional view illustrating an assembled state of FIG. 6. FIG. 8 is an exploded perspective view illustrating a portion of a steer-by-wire steering device according to the present embodiments.

According to the present embodiments, a steer-by-wire steering device 100 comprises a sliding bar 102 provided to be axially slidable in a housing 101 and having a screw formed on an outer circumferential surface thereof, a first shaft 121 hollow to allow the sliding bar 102 to be inserted thereto and rotated by an actuator 110, a plurality of second shafts 122 circumferentially provided between the sliding bar 102 and the first shaft 121 and including a screw shaft portion 311 having a screw formed on an outer circumferential surface thereof to be engaged with the sliding bar 102, and a supporting member 123 formed in an annular shape to be coupled to an inner circumferential surface of the first shaft 121 and having a coupling hole 123a through which an end of the second shaft 122 is inserted and coupled.

A description is made below with reference to FIGS. 1 to 3.

Two opposite ends of the sliding bar 102 are connected to tie rods (not shown), knuckle arms (not shown), etc., so that as the sliding bar 102 axially slides inside the housing 101, the wheels (not shown) are steered.

A screw is formed on the outer circumstantial surface of the sliding bar 102 to be engaged with the second shaft 122. The rotation of the second shaft 122 may be supported by the first shaft 121 and the supporting member 123, and as the first shaft 121 is rotated by the actuator 110, the sliding bar 102 is axially slid. As is described below, the rotation of the sliding bar 102 is limited by, e.g., the bushing member 610 so that the sliding bar 102 is not rotated and only slid axially.

In other words, unlike the conventional structure in which the ball nut is coupled to the rack bar, the present embodiments lack balls and thus need not form a large screw lead for inserting balls, rendering it possible to form a relatively small lead of the screw formed in the sliding bar 102 and thus implement a larger reduction ratio than that of the rack bar-ball nut coupled structure.

Further, the conventional rack bar-ball nut coupled structure inevitably causes knocking noise during recirculation of the balls between the rack bar and the ball nut. However, the present embodiments do not have balls and thus enhance noise performance, maximizing the driver's convenience particularly during autonomous driving.

Further, the conventional ball nut coupled structure has a large screw lead formed for insertion of balls and thus has difficulty in securing a sufficient reduction ratio to drive the rack bar and, to supplement the insufficient reduction ratio, has a nut pulley and a motor pulley. However, the present embodiments may secure a sufficient reduction ratio to slide the sliding bar 102 even without a pulley-belt structure, thus reducing components and allowing for a relatively simplified structure. In particular, the present embodiments does not include a low-rigidity belt and may thus increase the motor power and power transfer efficiency.

The first shaft 121 is hollow, and the sliding bar 102 is inserted into the first shaft 121 so that the first shaft 121 and the sliding bar 102 are coaxial.

Further, the first shaft 121 is rotated by the actuator 110. The actuator 110 includes a stator 112 and a rotator 111 and is coaxial with the sliding bar 102 and the first shaft 121. As such, since the first shaft 121 and the actuator 110 are coaxial with the sliding bar 102, and the second shaft 122 is positioned inside the first shaft 121, the overall size of the steering device may be reduced to make it easy to secure an installation space, as compared with the structure of the conventional steering device in which the motor is positioned on a side of the rack bar.

The coupled structure of the first shaft 121 and the rotator 111 is described below.

A plurality of second shafts 122 are circumferentially provided between the sliding bar 102 and the first shaft 121 and include a screw shaft portion 311 having a screw formed on the outer circumferential surface thereof to be engaged with the sliding bar.

Further, the supporting member 123 is formed in an annular shape and is coupled to the inner circumferential surface of the first shaft 121 and has a coupling hole 123a to which an end of the second shaft 122 is inserted and coupled.

The supporting member 123 is fixed circumferentially on the first shaft 121 and, although not shown in the drawings, may be coupled by, e.g., serrations. Further, an end of the second shaft 122 is rotatably coupled to the coupling hole 123a.

As shown in the drawings, two supporting members 123 may be provided and be coupled to two opposite ends of the first shaft 121 to support rotation of the second shaft 122.

In other words, the first shaft 121 and the supporting member 123 together are rotated by the actuator 110, and the second shafts 122 are removed around the sliding bar 102 by the rotation of the supporting member 123. As the screw shaft portion 311 is engaged with the sliding bar 102, the second shaft 122 rotates and, as the second shaft 122 rotates, the sliding bar 102 axially moves forward or backward.

Further, the second shaft 122 includes a supporting shaft portion 312 supported on the inner circumferential surface of the first shaft 121 so that the rotation of the second shaft 122 may be supported on the first shaft 121 by the supporting shaft portion 312.

In other words, a mountain portion and a valley portion engaged with each other are formed on the outer circumferential surface of the supporting shaft portion 312 and the inner circumferential surface supported on the supporting shaft portion 312 of the first shaft 121, so that the rotation of the second shaft 122 on the first shaft 121 is supported.

Accordingly, the supporting shaft portion 312 is supported on the inner circumferential surface of the first shaft 121, and the screw shaft portion 312 is supported on the outer circumferential surface of the sliding bar 102, and two opposite ends of the second shaft 122 are coupled with the supporting members 123.

Meanwhile, the supporting shaft portions 312 may be provided on two opposite ends of the second shaft 122. Further, two or more screw shaft portions 312 spaced apart from each other may be provided, and the supporting shaft portion 312 may be provided between the screw shaft portions 311.

In other words, the supporting shaft portions 312 and the screw shaft portions 311 may be alternately provided along the axial direction. In the drawings, an embodiment is illustrated in which the second shaft 122 includes two screw shaft portions 311 and three supporting shaft portions 312.

As a plurality of supporting shaft portions 312 are provided, the rotation of the second shaft 122 is stably supported on the first shaft 121.

Further, the screw shaft portion 311 is formed to have a larger diameter than that of the supporting shaft portion 312 to be stably engaged with the screw of the sliding bar 102. The inner circumferential surface of the first shaft 121 may be stepped and include a portion depressed to allow the screw shaft portion 311 to be inserted thereto and a portion protruding to be supported on the supporting shaft portion 312.

As such, as the first shaft 121 is rotated by the actuator 110, and the second shaft 122 is supported on the inner circumferential surface of the first shaft 121 and is coupled to the supporting member 123, the second shaft 122 may be rotated and revolved and, as the screw of the screw shaft portion 311 and the screw of the sliding bar 102 are engaged with each other, the sliding bar 102 is moved forward or backward.

Since the lead of the screw of the screw shaft portion 311 and the screw of the sliding bar 102 may be formed to be much smaller than the lead in the conventional ball nut coupled structure, it is possible to implement a large reduction ratio even with a single reduction structure and eliminate the need for a pulley-belt structure for secondary reduction as in the conventional steering device.

Meanwhile, the rotation structure of the first shaft 121 is described with reference to FIGS. 4 and 5.

The first shaft 121 is rotated by the actuator 110. A bearing 401 is coupled between the housing 101 and the first shaft 121 to support the rotation of the first shaft 121.

The outer ring of the bearing 401 may be coupled to the housing 101 by, e.g., a lock screw. Although not shown in the drawings, the outer ring of the bearing 401 may be coupled to the first shaft 121 by, e.g., a lock nut.

As the bearing 401 is coupled to the outer circumferential surface of the first shaft 121, the rotation of the first shaft 121 and the rotation and revolution of the second shaft 122 inside the first shaft 121 may be smoothly supported.

As described above, the actuator 110 includes a stator 112 and a rotor 111. The stator 112 is coupled to the inner circumferential surface of the housing 101 and, although not shown in the drawings, a winding is wound therearound.

The rotator 111 is hollow, and the sliding bar 102 is inserted thereto to be coaxial with the sliding bar 102 and the first shaft 121.

The rotator 111 is rotated along with the first shaft 121. As shown in FIG. 4, the first shaft 121 includes a coupling portion 411 formed by diameter expansion at the outer circumferential surface thereof. A coupling member 412 may axially pass through the coupling portion 411 to couple the first shaft 121 with the rotator 111 or, as shown in FIG. 5, the rotator 111 and the first shaft 121 may be integrally formed.

In other words, as the first shaft 121 and the rotator 111 are separately formed and are coupled by the coupling member 412 or are integrally formed, the first shaft 121 is rotated by the actuator 110.

Meanwhile, a structure for preventing rotation of the sliding bar 102 is needed to allow the sliding bar 102 to be axially slid by the actuator 110 and the first shaft 121.

Conventionally, the rotation of the sliding bar is prevented by forming a rack gear on the rack bar and providing a pinion shaft engaged with the rack gear. This way increases the number of components and renders assembly difficult.

Referring to FIGS. 6 and 7, a bushing member 610 is provided between the housing 101 and the sliding bar 102. A first flat portion 601 is chamfered and formed on the outer circumferential surface of the sliding bar 102, and a second flat portion 611 supported on the first flat portion 601 is provided on the inner circumferential surface of the bushing member 610 so that the first flat portion 601 and the second flat portion 611 are supported to prevent rotation of the sliding bar 102.

Accordingly, as in the present embodiments, the first flat portion 601 and the second flat portion 611 are provided, significantly reducing the number of components for preventing rotation of the sliding bar 102 while facilitating assembly.

Further, the bushing member 610 is coupled to the housing 101 and fixed in the circumferential direction. An insertion portion radially protruding may be formed on the outer circumferential surface of the bushing member 610, and an insertion recess 701 to which the insertion portion 612 is inserted may be depressed in the inner circumferential surface of the housing 101.

In other words, the bushing member 610 is axially fixed to the housing 101 by a nut 620 and is circumferentially fixed to the housing 101 by the insertion portion 612 and the insertion recess 701.

As such, as the bushing member 610 is coupled to the housing 101 and is circumferentially fixed, and the first flat portion 601 and the second flat portion 611 are supported, the sliding bar 102 may be prevented from rotation while only sliding in the axial direction.

Meanwhile, the moving position of the sliding bar 102 needs to be sensed to determine whether the wheels are steered to a target steering angle.

Conventionally, the position of the sliding bar is sensed from the rotation angle of the pinion shaft engaged with the rack gear described above. However, the present embodiments omit a pinion shaft and thus requires a new structure.

Referring to FIG. 8, a worm wheel gear 801 engaged with the screw of the sliding bar 102 may be provided to sense the position of the sliding bar 102 from the rotation angle of the worm wheel gear 801.

In other words, the screw of the sliding bar 102 may be coupled with the first shaft 121 and the second shaft, on one side, and be engaged with the worm wheel gear 801, on another spaced side.

Accordingly, as the sliding bar 102 slides, the worm wheel gear 801 is rotated, so that the position of the sliding bar 102 may be sensed from the rotation angle of the worm wheel gear 801.

The worm wheel gear 801 is not connected with the motor and thus is not overloaded. Further, as the number of rotations is small, durability against wear and heat is increased.

Further, conventionally, as the diameter of the pinion shaft is small, rotation of the sliding bar causes several turns of the pinion shaft. Thus, to detect the rotation angle of the pinion shaft, two or more sensor gears with different diameters are required, complicating the structure of the angle sensors and causing it tricky to derive the rotation angle.

To address such issues, the circumference of the worm wheel gear 801 may be formed to be longer than the maximum stroke of the sliding bar 102.

In other words, the radius of the worm wheel gear 801 is adjusted to prevent the worm wheel gear 801 from rotating by more than one turn when the sliding bar 102 slides, so that although only the absolute angle of the rotation of the worm wheel gear 801 is detected with one sensor gear, the position of the sliding bar 102 may be sensed, and the structure of the angle sensor may be simplified, and the derivation of the rotation angle may be simplified.

By the so-shaped embodiments, it is possible to provide an advantage in securing an installation space due to a reduction in the overall size, reduce noise to increase the driver's convenience, and increase power transfer efficiency and stability and rigidity in the inter-component coupled structure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATIONS

This application is the U.S. National Stage of International Patent Application No. PCT/KR2021/001772 filed on Feb. 10, 2021, which claims priority to Korean Patent Application No. 10-2020-0017251 filed in the Korean Intellectual Property Office on Feb. 12, 2020, the disclosure of which is incorporated by reference herein in its entirety.

The invention claimed is:

1. A steer-by-wire steering device, comprising:
a sliding bar provided to be axially slidable in a housing and having a screw formed on an outer circumferential surface thereof;
a first shaft hollow to allow the sliding bar to be inserted thereto and rotated by an actuator;
a plurality of second shafts circumferentially provided between the sliding bar and the first shaft and including a screw shaft portion having a screw formed on an outer circumferential surface thereof to be engaged with the sliding bar; and
a supporting member formed in an annular shape to be coupled to an inner circumferential surface of the first shaft and having a coupling hole through which an end of the second shaft is inserted and coupled.

2. The steer-by-wire steering device of claim 1, wherein two supporting members are provided to be coupled to two opposite ends of the first shaft.

3. The steer-by-wire steering device of claim 1, wherein the second shaft includes a supporting shaft portion supported on the inner circumferential surface of the first shaft.

4. The steer-by-wire steering device of claim 3, wherein a mountain portion and a valley portion engaged with each other are formed on an outer circumferential surface of the supporting shaft portion and the inner circumferential surface supported on the supporting shaft portion of the first shaft.

5. The steer-by-wire steering device of claim 3, wherein supporting shaft portions are provided on two opposite ends of the second shaft.

6. The steer-by-wire steering device of claim 3, wherein two or more screw shaft portions are provided to be spaced apart from each other, and wherein the supporting shaft portion is provided between the screw shaft portions.

7. The steer-by-wire steering device of claim 3, wherein the screw shaft portion has a larger diameter than the supporting shaft portion.

8. The steer-by-wire steering device of claim 1, wherein a bearing is coupled between the housing and the first shaft.

9. The steer-by-wire steering device of claim 1, wherein the actuator includes a stator coupled to an inner circumferential surface of the housing and a rotator hollow to allow the sliding bar to be inserted thereto and rotated, together with the first shaft.

10. The steer-by-wire steering device of claim 9, wherein the first shaft includes a coupling portion formed by diameter expansion at the outer circumferential surface thereof, and
wherein the first shaft and the rotator are coupled by a coupling member axially passing through the coupling portion and coupled by the rotator.

11. The steer-by-wire steering device of claim 9, wherein the rotator is integrally formed with the first shaft.

12. The steer-by-wire steering device of claim 1, wherein a bushing member is coupled between the housing and the sliding bar, and wherein a first flat portion formed to be chamfered is provided on an outer circumferential surface of the sliding bar, and a second flat portion supported on the first flat portion is provided on an inner circumferential surface of the bushing member.

13. The steer-by-wire steering device of claim 12, wherein an insertion portion radially protruding is formed on an outer circumferential surface of the bushing member, and an insertion recess to which the insertion portion is inserted is depressed in the inner circumferential surface of the housing.

14. The steer-by-wire steering device of claim 1, further comprising a worm wheel gear engaged with the screw of the sliding bar, wherein a position of the sliding bar is sensed from a rotation angle of the worm wheel gear.

15. The steer-by-wire steering device of claim 14, wherein a circumference of the worm wheel gear is longer than a maximum stroke of the sliding bar.

* * * * *